(12) United States Patent
Burkley

(10) Patent No.: US 6,362,875 B1
(45) Date of Patent: Mar. 26, 2002

(54) MACHINE VISION SYSTEM AND METHOD FOR INSPECTION, HOMING, GUIDANCE AND DOCKING WITH RESPECT TO REMOTE OBJECTS

(75) Inventor: Rodger E. Burkley, Stow, MA (US)

(73) Assignee: Cognax Technology and Investment Corp., Natick, MA (US)

( * ) Notice: Subject to any disclaimer, the term of this patent is extended or adjusted under 35 U.S.C. 154(b) by 0 days.

(21) Appl. No.: 09/458,908

(22) Filed: Dec. 10, 1999

(51) Int. Cl.[7] ......................... G01B 11/26; G01C 17/00; G06K 9/00
(52) U.S. Cl. .................. 356/139.03; 702/153; 382/103
(58) Field of Search ..................... 356/139.03; 382/106, 382/103, 153; 702/153; 348/169

(56) References Cited

U.S. PATENT DOCUMENTS 5,196,900 A * 3/1993 Pettersen
5,734,736 A * 3/1998 Palmer et al. .............. 382/103
6,167,831 B1 * 1/2001 Watt et al. .................. 114/322

* cited by examiner

*Primary Examiner*—Stephen C. Buczinski
(74) *Attorney, Agent, or Firm*—William Loginov

(57) ABSTRACT

A system and method for homing, docking and tracking of one object with respect to another provides a camera for acquring images and a machine vision processor interconnected with the camera. The machine vision processor includes a sacale-invariant and rotation-invariant pattern recognition application that retrieves stored images representative of the object being viewed that includes data representative of a fiducial within the object image. The stored image and its fiducial are compared to the acquired image. The image is aligned within the processor based upon a detected fiducial and the relative orientation and position of the object is determined based upon the acquired image. Data representative of the relative position and orientation is used to manipulate one of the objects so as to bring at least one of the objects to a predetermined position with respect to the other of the objects. The predetermined position can be a docked position or a following, on-station position, among others.

16 Claims, 3 Drawing Sheets

MACHINE VISION SYSTEM AND METHOD FOR INSPECTION, HOMING, GUIDANCE AND DOCKING WITH RESPECT TO REMOTE OBJECTS

FIELD OF THE INVENTION

This invention relates to machine vision systems and more particularly to machine vision systems that enable the orienting of one remote, movable object with respect to another.

BACKGROUND OF THE INVENTION

There are many instantances in which one remote object must be positioned or oriented with respect to another while one or both objects are moving at relative speed. For example, a vehicle that is piloted by an on-board or remote operator moving through air, space or water must often orient itself with respect to another stationary or moving object or structure. The goal of such maneuvers may be a docking between objects or parts of the objects, approach or departure of the objects with respect to one another, or "station-keeping" in which one object maintains a regulated orientation with respect to the other. Smaller-scale devices, such as endoscopic probes, may require orientation information as they wind their way into a confined space, such as the interior of a jet engine to inspect for defects or damage.

In certain instances, information about a remote structure or object is obtained by another object using a variety of active tracking techniques that include transmission and receipt of active signals such as radar, sonar, and laser using a dedicated transceiver. Based upon feedback (return of signals) from these active tracking systems, appropriate position and orientation data are obtained for the target object or structure. Using this data, one or both or the objects can be more accurately maneuvered into position for docking or to perform other operations that require the relative position of the two objects to be regulated. The maneuvering of one object with respect to another is often directed by a manual operator acting upon the data provided by the active tracking system. In some instances, fairly sophisticated automated systems enable one or both objects to move with respect to each other in response to the tracking system information. Generally, these active tracking systems require expensive and cumbersome devices, usually employing one or more cumbersome emitters or antennas and associated receivers on one or both objects. Accordingly, complex tracking and homing systems are often deployed only on very expensive equipment and only in limited situations.

It is, therefore an object of this invention to provide a system and method for enabling tracking, homing, docking, guidance and generalized station keeping by a first object with respect to a second object or that is reasonably cost-effective, compact and, therefore, applicable to a variety of situations. This system and method should interface with existing hardware and software and should be operable with relatively conventional computer hardware. This system should enable a high degree of three-dimensional tracking, homing, docking, guidance and station-keeping accuracy to be maintained in a variety of conditions, even where both objects are moving with respect to each other.

SUMMARY OF THE INVENTION

This invention overcomes the disadvantages of the prior art by providing a system and method for tracking, homing, docking, guidance, and generally maintaining relative position, by a first object with respect to a second object using a machine vision system and at least one associated camera. A machine vision system interacting with the camera or similar optical sensors on the first object acquires an image of the second object (or a portion thereof based upon trained or preloaded image data of the second object. The system attempts to locate a fiducial, or other prominent feature, within the overall acquired image. This fiducial is a relatively localized and readily identifiable structure on the second object—for example, a light or group of lights, a fin or a painted spot. The machine vision system, which typically includes commercially available software applications having scale and rotation-invariant pattern recognition capabilities, searches, identifies and analyzes the position of the fiducial or pattern within the acquired image. Based upon analysis of the fiducial, the acquired image is aligned and oriented with respect to the stored "model" image. Such stored "model" image can, in fact be substituted for real-time acquired images of objects. This can occur when the object acquires an image of another adjacent object with which it plans to orient itself. The term "model image" should, therefore, be taken broadly to include such real-time/on-the-fly images.

The system then continues to acquire further images and, thereby, continuously determines the relative alignment and orientation of the acquired image with respect to the first object's field of view. In performing its analysis the machine vision system analyzes the scale and orientation of the now-aligned, acquired image. Using scale and angular/rotational data, inherent functionalities of the machine vision system calculate a three-dimensional solution that includes relative position, orientation and range of the second object with respect to the first. Based upon the calculated solution, control surfaces or thrust members on the first object, second object or both can be manipulated either manually, or via an on-board autopilot to bring the first and second objects into a desired positioning with respect to each other—typically docked or on-station.

In one embodiment, the camera may be present on first object, while the resulting tracking data is fed to the second object, which the first views, to be acted upon by automated or manual controls associated with the second object. In another embodiment, systems and associated cameras may be fitted to and operational upon both the first and second objects. Additional objects, also having systems therein that act independently, or in communication with each other are also contemplated.

BRIEF DESCRIPTION OF THE DRAWINGS

The foregoing and other objects and advantages will become more clear with reference to the following detailed description as illustrated by the accompanying drawings in which.

DETAILED DESCRIPTION

Figure 1:
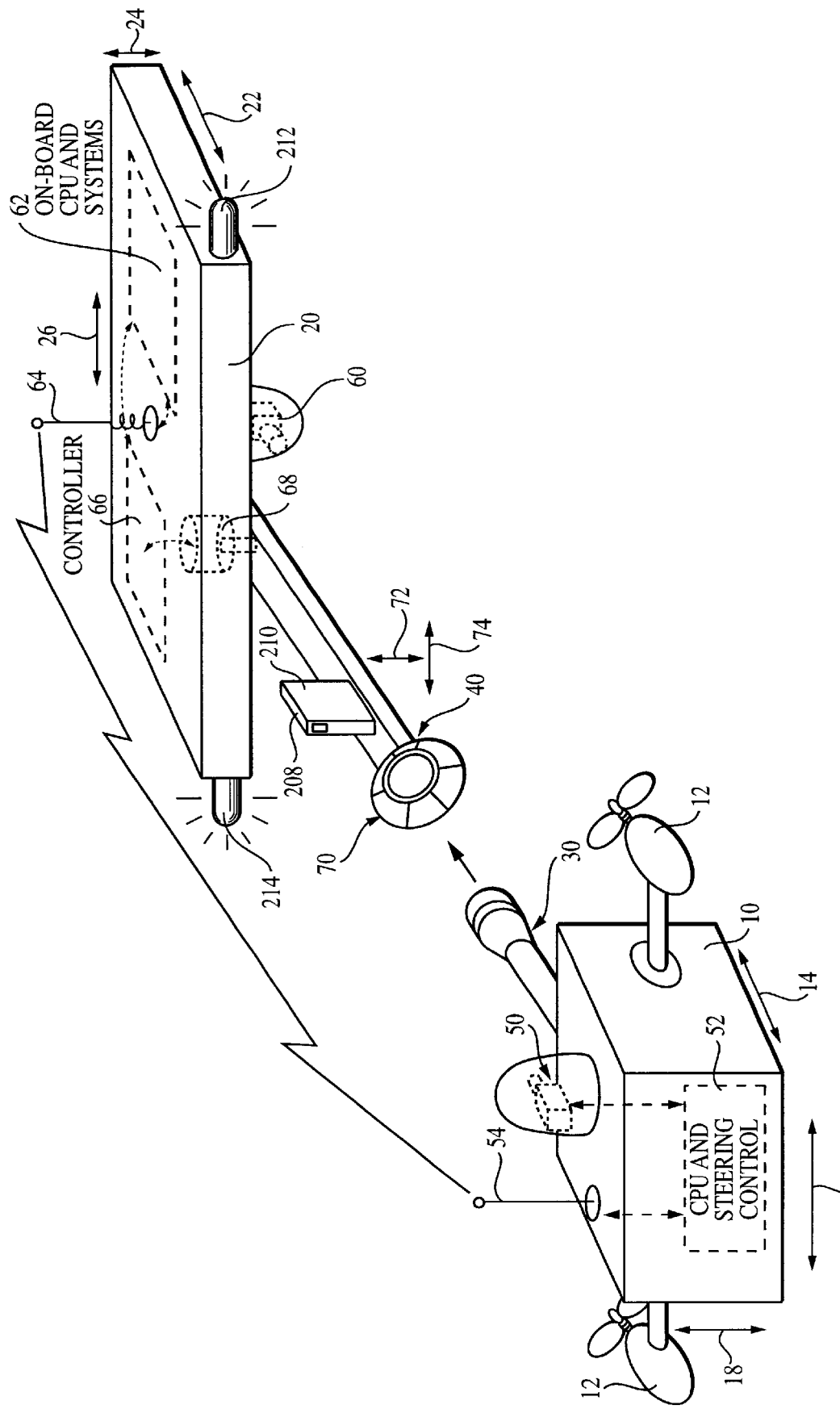
FIG. 1 is a schematic perspective view of first and second moving objects being oriented using the tracking, homing, docking and guidance system and associated method according to this invention.

FIG. 1 illustrates the operation of a tracking, homing, docking and guidance system according to an embodiment of this invention. A first object 10 is propelled on land, sea or air using propulsion units shown generically as propeller pods 12. However, any propulsion system and/or control surfaces can be used to guide the object 10. The choice of propulsion and steering for the object depend, in part, upon the medium through which the unit is being propelled. In general, a combination of propulsion units and control surfaces enable the object to move along at least three axes (double arrows 14, 16 and 18) along with appropriate roll, pitch and yaw orientations. Likewise, a second adjacent object or structure 20, that is either moving or stationary, is shown. For the purposes of this description, the second object 20 is assumed to be moving along at least three axes (double arrows 22, 24 and 26), and is capable of roll, pitch and yaw movements. The second object 20 also includes propulsion and steering systems as appropriate (not shown).

The first object 10 and the second object 20 each include a corresponding docking unit 30 and 40, respectively. For the purposes of this example, the docking units are elements that must be brought together while at least the first object 10 is moving relative to the second object 20. This description is meant to be taken broadly, and the docking units 30 and 40, as well as their underlying objects, can comprise any two elements that are brought together, or alternatively elements that must be kept generally at a predetermined regulated distance and orientation with respect to each other (e.g. on-station).

The first object 10 includes a camera 50 positioned so as to view a region that generally includes the proximity of the docking unit 30 this camera 50 can comprise an appropriate Charge Coupled Device (CCD) camera with a wide-angle, or otherwise appropriate, lens for viewing the area of interest adjacent to the second object. Focal length and field of view for the camera 50 are determined generally by the expected range of distances between objects in which docking and homing will occur, as well as the size of the opposing docking unit.

The camera 50 is operatively connected using appropriate video and data lines to an on-board Central Processing Unit (CPU) and steering control 52 in this embodiment. In an alternate embodiment, the CPU need not be located in the object 10. A transmitting and receiving antenna 54 and associated transceiver (not shown) is also interconnected to the camera's data path. In the alternate embodiment, information from the camera can be transmitted directly via the antenna 54 to a remote CPU. Steering and propulsion control, of the first object, likewise, can be automated using various well-known autopilot and position feedback mechanisms. More basically, control can be input manually by a human operator who reads displayed data generated by the CPU related to relative positions of the objects.

Similarly, the second object includes its own camera 60 that can also comprise an appropriate CCD unit. This camera 60 is linked to on-board systems that can include a CPU 62. The CPU 62 is joined to the transmitting and receiving antenna 64 and also to a controller 66. In this embodiment, the controller operates a docking unit steering mechanism 68. The steering mechanism enables relative movement of the distal end 70 of the docking unit 40 within a limited range of movement (double arrows 72 and 74). In an air/fluid environment, there can be provided fins or steerable drogue devices near the distal end 70 to accomplish steering through the rushing air/fluid. Note that, while the cameras 50 and 60 are located on the main bodies of their corresponding objects 10 and 20, the cameras can be positioned anywhere that a desired field of view is attained. For example, cameras can be mounted directly on the docking units, at or near their respective distal ends.

Figure 2:
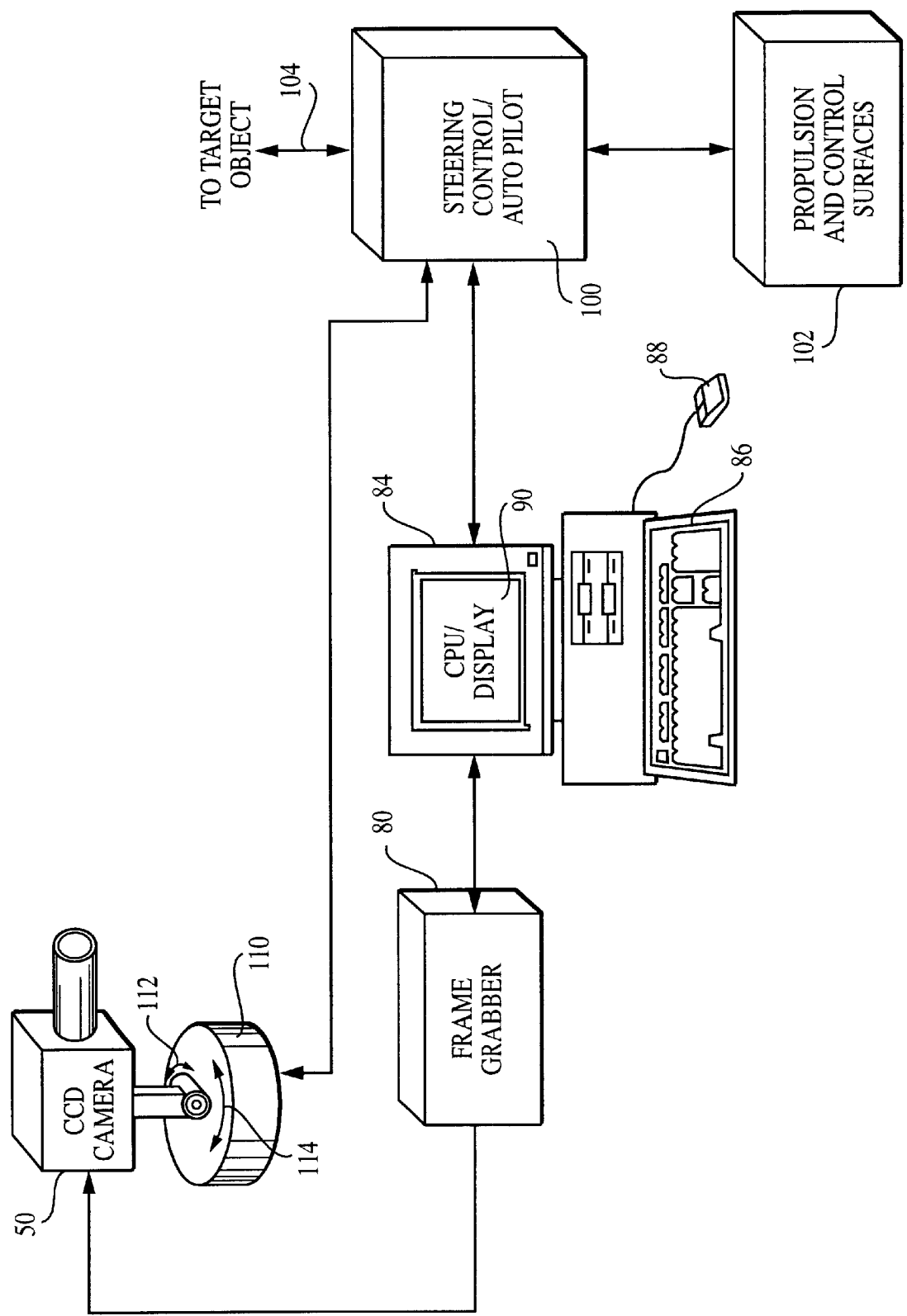
FIG. 2 is a schematic perspective view of a machine vision system incorporated within the system and method according to this invention.

Reference is now made to FIG. 2, which describes the machine vision system according to this invention in greater detail. The camera 50 (which for the purposes of this example resides on the first object 10), is interconnected with a frame grabber 80 which periodically captures video images and transmits resulting digital image pixel data to the CPU. In this embodiment, the CPU comprises a microcomputer 84 that is generally conventional in design including a keyboard 86, a mouse 88 and/or other input output devices such as a touch screen and a display 90. The computer also includes disk memory storage or other acceptable memory storage units within which software-based applications and readable/writeable data reside. The computer 84 is configured to operate a commercially available pattern recognition machine vision product. Any number of products can be employed. According to a preferred embodiment, the product can comprise a scale-invariant and rotation-invariant visual pattern recognition algorithm set that recognizes objects and/or patterns using geometric description and mathematical representation of boundaries and features within an acquired object. One such scale and rotation-invariant pattern recognition application is the widely used PatMax™ available from Cognex Corporation of Natick, Mass. An associated product for searching out, identifying and aligning acqured images based upon an acquired fiducial is also employed. One such fiducial identification/manipulation application is available commercially as the FiducialFinder™, also available from Cognex also operates on the computer. Again, any applicable fiducial recognition application can be used according to this invention. For the purposes of this description, the terms pattern recognition application, pattern recognition software, or pattern recognition system as used herein shall refer generally to any manufacturer's application that enables scale-invariant and rotation-invariant acquisition of images and manipulation thereof, and any associated fiducial identification/manipulation application. The function of the pattern recognition system or application, according to this invention, is described further below.

The computer 84 receives raw acquired image data from the camera 50, which is aimed generally at the second object. The computer's pattern recognition application converts the captured image data into pattern data that can be recognized and manipulated by the application. The procedure for handling and analyzing data is described in detail below. In general, the analyzed data is manipulated by the computer 84 or by another computer (not shown) for transmission to a steering control/autopilot unit 100 that transmits steering and propulsion control signals to appropriate propulsion and control surfaces 102. Likewise, telemetry can be transmitted to the other object as referenced by the link arrow 104. As an option, the camera can be mounted on a moving base 110 in communication with the steering control 100 or another control block. The base can include appropriate stepper motors, servos or other control actuators for removing the camera in a variety of axes (curved arrows 112 and 114). In this manner the camera can be moved independently to focus upon an area of interest with respect to the second object. This arrangement is particularly useful where the first object must remain at a predetermined on-station position with respect to the second object wherein the positions are not in direct alignment (and the camera must be tilted to view the second object).

Figure 3:
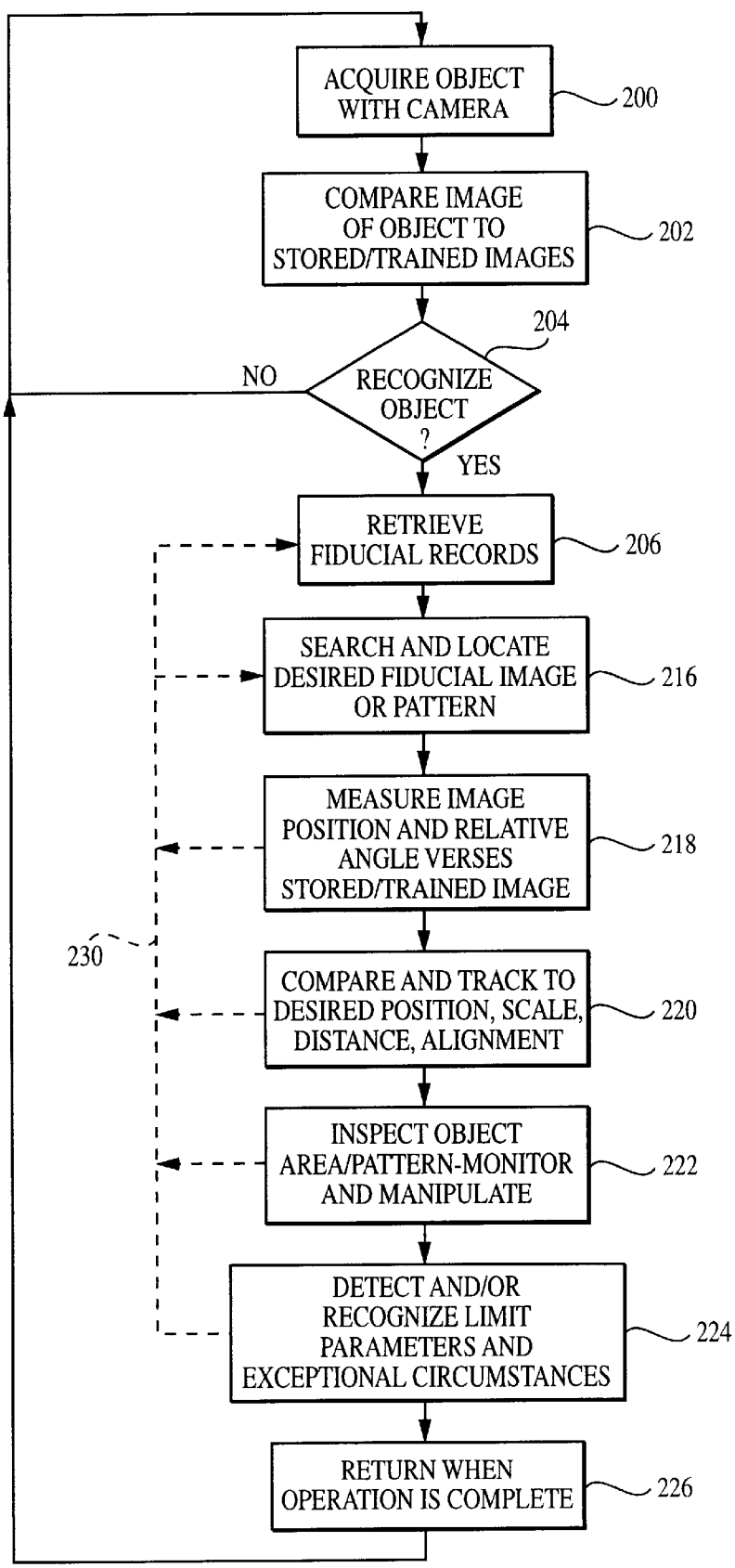
FIG. 3 is a flow diagram showing the operation of a machine vision system according to this invention.

Further reference is now made to FIG. 3, which details the operation of the system. An object image is first acquired using the camera and frame grabber according to block 200. This requires generally that the object be located within viewable range and that the camera be configured so that the required features of the object fall within its field of view in sufficient focus to be discernable. The next block 202 references the comparison of the acquired image of the object to image data stored—model image data. This model image data can be produced by previously setting up a scene that is viewed by the system in which the objects are in a desired orientation. In other words, the camera is focused on an object for a sufficient period of time under desired orientation conditions (e.g. while docked or while approaching a docking position) for detail to be observed, and the image or images then become the "trained" image(s) for later operations. In other words a "model" image can be derived from a geometric/synthetic image created by a programmer, or by viewing an actual image. In fact, as defined herein, a "model image" can be an image acquired in "real-time" during operation (e.g. on-the-fly), wherein the system acquires an image of an adjacent object as the model, and tracks based upon this model. This is particularly useful where the exact shape, size and orientation of the object is not known until it is in proximity with the acquiring object such as in maintaining a group formation or station keeping.

In the comparison step (202), the pattern recognition application generally utilizes known blob and/or geometric feature description techniques to conduct comparison of the acquired image to stored images.

According to the decision block 204, if the object is not recognized when compared to stored images, then another attempt to acquire the object, or an underlying feature of the object, is made. This may occur after the objects have become more aligned with respect to each other or have closed in range. Generally a desired range and alignment for beginning the tracking procedure is typically specified and it is the operator's responsibility to set up this initial positioning before the system is employed. Once the object is recognized, stored fiducial records are then retrieved from the system storage in order to refine the search for object features. This is detailed in block 206. Fiducials and/or patterns are known structures that are relatively localized on a larger object. For example, a fiducial can be one or more marker lights each located in a particular position on the object. The fiducial can also be a pronounced structure such as a fin or even a dedicated "fiducial spot." Referring also to FIG. 1, a fiducial 208 is shown on an upright formation 210 mounted on the end of the docking structure 40. This upright structure 210 can be a fin, a marker light, a camera lens or any other acceptable object. As noted, a group of points within the object can act together as a fiducial, such as the marker lights (transmitting "light" in the visible or invisible spectrum) 212 and 214 on the second object 20.

According to block 216, the fiducial is searched-out within the acquired image of the object using, for example, the Fiducial Finder application described above. The application determines fiducial alignment based upon, for example, x and y-axis coordinates. It rapidly translates the acquired image based upon the alignment data so that a meaningful analysis of the underlying image can be determined. Following alignment, according to known techniques, the acquired image is ascribed a relative scale orientation based upon comparison with the stored image. One object is then oriented with respect to the other, and the relative reference points there between are fixed by measuring the acquired image size and relative angle with respect to the stored image size and relative angle. This employs various scaling and angle detection functions inherent within the pattern recognition application. In a simple example, the stored or trained image may define the shape of a perfect square. This square may be aligned with nearly perfect vertical and horizontal opposing sides indicating an optimal straight-and-level docking approach profile for the first object to make with respect the second "square" object. If the actual image acquired is that of a tilted rectangle, the application (once image alignment occurs) determines that the underlying object (the second object in this example) is in front of the acquiring object (the first object) and turning away at a bank angle.

Once an initial position and orientation is fixed (block 218), the system continuously compares the current acquired image to an underlying desired view of the image (block 220). This is, in essence, the calculation of a tracking, homing, docking or guidance solution. In the above example, where a square of a certain size and angle is the desired image, the application, using known geometric solutions, now calculates the second object's relative distance and direction of movement/orientation based upon the difference between the actual small-sized, tilted rectangle and ideal larger-sized, level square. Knowing these values, the first object can be given instructions on how to move with respect to the second object in order to properly follow and/or close the distance with the first object. This is referenced in block 222 where the underlying pattern is manipulated by means of relative movement between objects or their underlying components (e.g. docking units). Calculation of tracking solutions and manipulation can occur as a continuous loop until a desired image is acquired. This desired image, having a certain size, shape and angular orientation, can represent a successful docking activity. In other words, when a square of a certain size and orientation is acquired, this means that the first object is sufficiently close in proximity to the second so that docking has occurred between the two docking units 30 and 40. This is referenced in block 224 in which limits for extremes are recognized. Limits are, for example, a successful docking while extremes may be the movement of an object out of visible range or a sudden movement that causes the objects to become undocked. When an operation or cycle of the operation is complete, the system can be reset to search for the next object according to block 226.

Note that any of the blocks 220, 222 and 224 can comprise, in essence, a sub-loop back to a preceding block if no activity outside the scope of the subject block needs to be taken. For example, if position is maintained at a desired location and no changes are required according to block 218, the system may branch back to either of blocks 206 or 216 (shown by the dotted optional branch line 230). Similarly, if only a tracking of the position and calculation of a homing solution is necessary, then the block 220 may simply branch back from this location. This may be desired particularly where no physical manipulation of one object with respect to another is desired. For example, where an object is being manually controlled, the delivery of tracking or homing data may be delivered by a display or other means to an operator who physically controls the object to enable it to dock or track another object.

Having described a generalized process and arrangement for a homing, docking and tracking system, a more specific example is now described. This example refers generally to FIG. 1, but may be applicable to any arrangement where at least one of the docking units (40) is moveable on an underlying object (20) that is also moves through air, space, land or water. The object 20 includes, stored in its on board computer system trained fiducial images and patterns of docking unit profiles for the another object including (but not necessarily limited to) the first object 10. These images can be based on actual image data or synthetically produced image data. Within a predetermined distance, the computer system of the second object (20) would identify the image of the docking unit 10 and locate it. It would then fix on the exact fiduciary point of the docking unit 10 for alignment corrections and precise measurements. At this time, guidance information can be transmitted to the first object 10 via the antennas 64 and 54 to aid the automatic or human pilot of the object 10 in its alignment with respect to the second objects docking unit 40. The controller/actuator (control device 68, for example) of the docking unit 40, or a series of fins (structure 210, for example) near the distal end of the docking unit 40 can be used to move it within a predetermined arc relative to a neutral position. Based upon the principles described above, the computer system of the second object 20 can determine x and y-axis position (with respect to an arbitrary origin), relative angle, distance and relative motion information with respect to the first object 10. This movement can be fed into a controller (66) for moving the second object's docking unit 40 within the predetermined arc so that it follows the location and position of the first object's docking unit 30.

Conversely, the camera on the first object 10 can be tied to the autopilot as described above and the system can lock on a fixed fiducial marker on the second object 20. Small movements between the second object's movable docking unit 40 and the first object's docking unit 30 can be reported to the operator of the first object so that he or she can make course corrections. Similarly, these movements can actually be fed into the steering control system via the autopilot to automatically correct the position and speed of the first object 10. In an alternate embodiment, a camera on one object can be linked to a control system on the other object. In other words, the first object 10 can acquire images of the second object's docking unit 40 and thereby trigger the docking unit 40 controller/actuator to move so as to align it with respect to the first object 10 and its docking unit 30. Telemetry enabling one camera to control another, remote object can be fed through the antennas 54 and 64.

In an alternate example, a camera can be located directly in a drag-producing member (such as a basket) located at the tip of the second object's docking unit. The docking unit in this example can be a retracting, flexible hose rather than a rigid pipe. The flexible hose is dragged behind the second object as it moves through air or fluid, the tip being held back and stabilized by the drag-producing member. The camera is designed to lock on to a fiducial positioned on the tip of the first object's docking unit 30. The drag-producing member can operate in conjunction with one or more small steerable vanes (such as the structure 210) that are controlled by the controller computer system on the second object or by a manual operator to effect small up/down and left/right movement of the drogue within a limited range of movement.

The foregoing has been a detailed description of the invention. Various modifications and additions can be made without departing from the spirit and scope thereof. For example, while the described system and method are shown for use in homing, docking and tracking of one object with respect to another, it is contemplated that other applications can be employed, such as the movement of a remote camera of endoscopic device through a complicated arrangement of parts such as the interior of a jet engine. This system can also be used to align parts for assembly such as in the case of a broken underwater pipe. Accordingly, this description is meant to be taken only by way of example and not to otherwise limit the scope of the invention.

What is claimed is:

1. A system for tracking and guiding the position of a first object with respect to a second object comprising:
    a camera assembly located with respect to the first object;
    a machine vision processor in communication with the camera assembly constructed and arranged to acquire an image of the second object and to locate a fiducial within the acquired image;
    an image storage bank in communication with the machine vision processor, including a predetermined stored image data representative of the second object and the fiducial;
    means, within the machine vision processor, for comparing the stored image data with the acquired image and for determining relative distance and orientation of the acquired image with respect to a known distance and orientation of the stored image data;
    a translator, responsive to the means for comparing and determining, that generates position data for the first object with respect to the second object; and
    means for transmitting the position data from the first object to the second object to aid guiding the position of the second object with respect to said first object.

2. The system as set forth in claim 1 further comprising a controller, operatively connected to the translator, for controlling positioning of the first object with respect to the second object in response to data provided by the translator.

3. The system as set forth in claim 2, wherein the machine vision processor includes a computer readable medium executing program instructions thereon for performing scale-invariant and rotation-invariant pattern recognition with respect to the acquired image.

4. The system as set forth in claim 3 wherein each of the first object and the second object include a respective first docking unit and second docking unit and wherein the controller is constructed and arranged to move the first docking unit with respect to the second docking unit to thereby align and engage the first docking unit with respect to the second docking unit.

5. The system as set forth in claim 4 wherein at least one of the first docking unit and the second docking unit comprise an elongated member.

6. The system as set forth in claim 5 wherein the first docking unit includes a movement controller that causes the first docking unit to move within a predetermined range of movement.

7. The system as set forth in claim 3 wherein the machine vision processor further includes an aligner that, based upon a location of the fiducial in the acquired image determines an alignment of the acquired image with respect to the stored image data.

8. The system as set forth in claim 7 wherein the fiducial comprises at least one localized structure on the second object within a field of view of the camera.

9. A method for tracking and guiding the position of a first object with respect to a second object comprising:
    acquiring, with a machine vision processor in communication with a camera assembly, an image of the second object and locating a fiducial within the acquired image;
    retrieving stored image data from an storage bank in communication with the machine vision processor, the stored image data being representative of the second object and the fiducial;
    comparing, using the machine vision processor, the stored image data with the acquired image and determining relative distance and orientation of the acquired image with respect to a known distance and orientation of the stored image data;

generating, based upon the determining step, position data for the first object with respect to the second; and transmitting the position data from the first object to the second object to aid guiding the position of the second object with respect to the first object.

10. The method as set forth in claim 9 further comprising controlling, in response to the generating step, positioning of the first object with respect to the second object.

11. The method as set forth in claim 10, wherein the step of comparing and the step of determining includes executing program instructions of a computer readable medium that performs scale-invariant and rotation-invariant pattern recognition with respect to the acquired image.

12. The method as set forth in claim 11 wherein each of the first object and the second object include a respective first docking unit and second docking unit and wherein the step of positioning includes moving the first docking unit with respect to the second docking unit to thereby align and engage the first docking unit with respect to the second docking unit.

13. The method as set forth in claim 12 further comprising defining the first docking unit as an elongated member.

14. The method as set forth in claim 13 wherein the step of positioning includes moving the first docking unit within a predetermined range of movement.

15. The method as set forth in claim 11 further comprising aligning, based upon a location of the fiducial in the acquired image, the acquired image with respect to the stored image data.

16. The system as set forth in claim 15 wherein the step of aligning includes identifying at least one localized structure on the second object within a field of view of the camera and recognizing the localized structure as the fiducial.

* * * * *

UNITED STATES PATENT AND TRADEMARK OFFICE
CERTIFICATE OF CORRECTION

PATENT NO. : 6,362,875 B1
DATED : March 26, 2002
INVENTOR(S) : Burkley

It is certified that error appears in the above-identified patent and that said Letters Patent is hereby corrected as shown below:

<u>Title page,</u>
Item [73], Assignee should be:

Cognex Technology and Investment Corporation not

Cognax Technology and Investment Corporation

Signed and Sealed this

Twenty-eighth Day of May, 2002

Attest:

Attesting Officer

JAMES E. ROGAN
*Director of the United States Patent and Trademark Office*